(12) United States Patent
Takiguchi et al.

(10) Patent No.: US 11,071,131 B2
(45) Date of Patent: Jul. 20, 2021

(54) BASE STATION AND TRANSMISSION METHOD

(71) Applicant: NTT DOCOMO, INC., Tokyo (JP)

(72) Inventors: Takahiro Takiguchi, Tokyo (JP); Kohei Kiyoshima, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 89 days.

(21) Appl. No.: 15/762,343

(22) PCT Filed: Jan. 17, 2017

(86) PCT No.: PCT/JP2017/001429
§ 371 (c)(1),
(2) Date: Mar. 22, 2018

(87) PCT Pub. No.: WO2017/130800
PCT Pub. Date: Aug. 3, 2017

(65) Prior Publication Data
US 2018/0279342 A1 Sep. 27, 2018

(30) Foreign Application Priority Data
Jan. 26, 2016 (JP) .............................. JP2016-012527

(51) Int. Cl.
*H04W 72/12* (2009.01)
*H04W 72/04* (2009.01)
(Continued)

(52) U.S. Cl.
CPC ... *H04W 72/1273* (2013.01); *H04W 72/0413* (2013.01); *H04W 88/085* (2013.01); *H04W 92/12* (2013.01); *H04W 92/20* (2013.01)

(58) Field of Classification Search
CPC ............. H04W 88/08; H04W 72/0413; H04W 72/1273; H04W 72/1263; H04W 88/085; H04W 92/12; H04W 92/20
(Continued)

(56) References Cited

U.S. PATENT DOCUMENTS 10,050,819 B2   8/2018   Chen et al.
2004/0264433 A1  12/2004   Melpignano
(Continued)

FOREIGN PATENT DOCUMENTS

EP   2515603 A2   10/2012
EP   2632072 A1   8/2013
(Continued)

OTHER PUBLICATIONS

International Search Report of the International Searching Authority issued in PCT/JP2017/001429 dated Mar. 7, 2017 (5 pages).
(Continued)

*Primary Examiner* — Rownak Islam
(74) *Attorney, Agent, or Firm* — Osha Bergman Watanabe & Burton LLP

(57) ABSTRACT

A base station used as a first base station in a wireless communication system including the first base station, a second base station that communicates with the first base station, and a user equipment that communicates with the first base station includes: a reception unit that receives a parameter used for generating a downlink physical data channel and data to be transmitted toward the user equipment from the second base station; a generating unit that generates the downlink physical data channel by performing processing of Layer 1 on the data using the parameter; and a transmission unit that transmits the generated downlink physical data channel.

20 Claims, 12 Drawing Sheets

(51) Int. Cl.
*H04W 88/08* (2009.01)
*H04W 92/12* (2009.01)
*H04W 92/20* (2009.01)

(58) Field of Classification Search
USPC .......................................................... 370/330
See application file for complete search history.

(56) References Cited

U.S. PATENT DOCUMENTS

| | | | |
|---|---|---|---|
| 2011/0171944 A1 | 7/2011 | Kobayashi et al. | |
| 2012/0033609 A1* | 2/2012 | Suda | H04B 7/155 370/315 |
| 2014/0064234 A1* | 3/2014 | Tong | H04W 72/0413 370/329 |
| 2014/0254530 A1* | 9/2014 | Kim | H04L 5/0019 370/329 |
| 2016/0036571 A1* | 2/2016 | Park | H04B 7/024 370/330 |
| 2017/0111886 A1* | 4/2017 | Kim | H04W 48/14 |
| 2017/0118745 A1* | 4/2017 | Nogami | H04L 5/1469 |
| 2017/0373890 A1* | 12/2017 | Fertonani | H04L 25/02 |
| 2018/0138957 A1* | 5/2018 | Wang | H04W 72/04 |
| 2018/0359790 A1* | 12/2018 | Ingale | H04W 28/16 |

FOREIGN PATENT DOCUMENTS

| | | |
|---|---|---|
| JP | 2005-509381 A | 4/2005 |
| JP | 2014-230196 A | 12/2014 |
| WO | 2014/076004 A2 | 5/2014 |
| WO | 2015/169013 A1 | 11/2015 |
| WO | 2015/172290 A1 | 11/2015 |

OTHER PUBLICATIONS

Written Opinion of the International Searching Authority issued in PCT/JP2017/001429 dated Mar. 7, 2017 (4 pages).
NTT Docomo, Inc.; "5G Radio Access: Requirements, Concept and Technologies"; Docomo 5G White Paper, Sep. 2014 (27 pages).
3GPP TS 36.213 V12.4.0; "3rd Generation Partnership Project; Technical Specification Group Radio Access Network; Evolved Universal Terrestrial Radio Access (E-UTRA); Physical layer procedures (Release 12)"; Dec. 2014 (225 pages).
Matsunaga, Y.; "Radio Access Network Architecture Evolution toward 5G"; IEICE Technical Report, vol. 114, No. 254; Oct. 9, 2014, pp. 89-94 (6 pages).
Extended European Search Report issued in counterpart European Patent Application No. 17744030.2, dated Jun. 26, 2019 (15 pages).
Office Action issued in the counterpart Japanese Patent Application No. 2017-564182, dated Feb. 16, 2021 (5 pages).

* cited by examiner

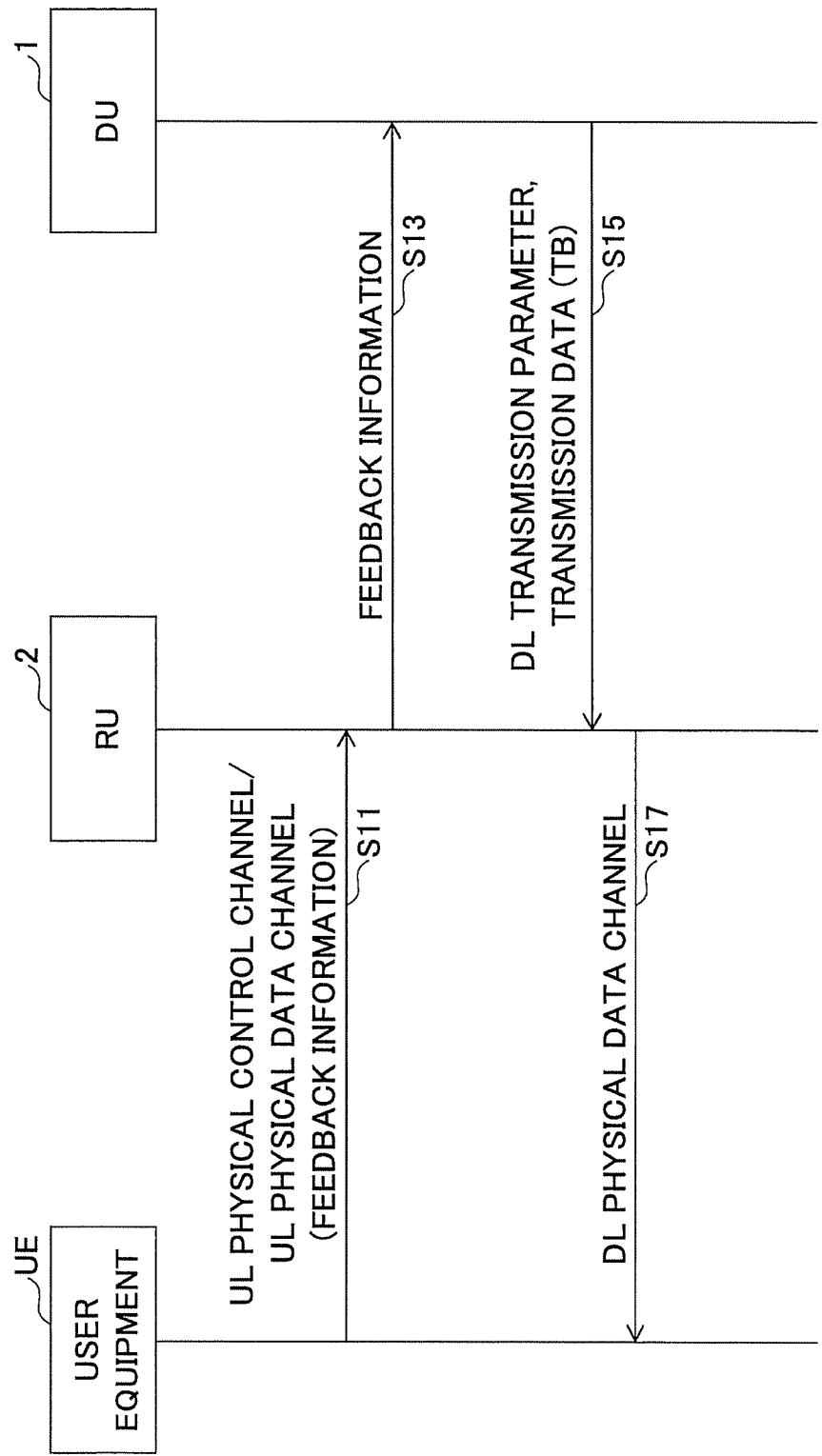

FIG.6A

| RADIO QUALITY MEASUREMENT INFORMATION |
|---|
| DELIVERY CONFIRMATION INFORMATION |

FIG.6B

| UE IDENTIFIER |
|---|
| TRANSMISSION DATA SIZE (TBS) |
| CELL UNIQUE ID |
| MODULATION SCHEME |
| CODING RATE |
| REDUNDANCY VERSION |
| NUMBER OF LAYERS |
| PRECODING INFORMATION |
| ALLOCATION RESOURCE INFORMATION |
| OTHER CHANNEL RESOURCE CONFIGURATION INFORMATION |

FIG.8B

| ALLOCATION RESOURCE INFORMATION |
|---|
| OTHER CHANNEL RESOURCE CONFIGURATION INFORMATION |

FIG.9

| index | NUMBER OF RBS | MODULATION SCHEME | TBS | ... |
|---|---|---|---|---|
| 1 | 4 | QPSK | 56 | ... |
| 2 | 4 | 16QAM | 616 | ... |
| 3 | 8 | QPSK | 208 | ... |
| ... | ... | ... | ... | ... |

BASE STATION AND TRANSMISSION METHOD

TECHNICAL FIELD

The present invention relates to a base station and a transmission method.

BACKGROUND ART

In LTE (Long Term Evolution) and LTE-A (LTE-Advanced) wireless communication systems, in order to efficiently support high traffic areas such as hot spot areas, a technique called C-RAN (Centralized Radio Access Network) capable of accommodating a number of cells while suppressing a device cost is known.

C-RAN includes one or a plurality of RUs (Radio Units) which is a remote base station and a DU (Digital Unit) which is a base station that controls the RUs in a centralized manner. The DU includes the functions of Layer 1 to Layer 3 included in a base station, an OFDM (Orthogonal Frequency Division Multiplexing) signal generated by the DU is sampled and transmitted to the RU and is transmitted from an RF (Radio Frequency) functional unit included in the RU.

CITATION LIST

Non-Patent Document

Non-Patent Document 1: "DOCOMO 5G White Paper," September 2014, NTT DOCOMO, Internet URL: https://www.nttdocomo.co.jp/corporate/technology/whitepaper_5g/

SUMMARY OF THE INVENTION

Problem to be Solved by the Invention

Next, a configuration of C-RAN discussed in 5G will be described. In FIG. 1, a 4G-DU and a 4G-RU mean a DU and a RU having the LTE-A functions (including the LTE functions). Moreover, a 5G-DU and a 5G-RU mean a DU and a RU having the functions of 5G radio techniques. The 4G-DU and the 5G-DU are connected by an interface which expands the interfaces X2-AP and X2-U in the LTE. Moreover, a network line that connects a DU and a RU is referred to as a FH (Front Haul), and in the LTE, a CPRI (Common Public Radio Interface) is used in the FH.

In the current LTE, it is assumed that the functions of Layer 1 (physical layer: L1) and Layer 2 (MAC, RLC, and PDCP) are implemented on the DU side. Due to this, a band required for FH is approximately 16 times the peak rate supported by the DU. For example, when a system band is 20 MHz and the DU supports radio communication (150 Mbps at most) of 2×2 MIMO (Multi Input Multi Output), the band required for FH is approximately 2.4 Gbps.

In 5G which is currently being discussed, it is expected that a peak rate of 10 Gbps and higher and a further reduction in latency are realized. Therefore, when 5G is introduced, the band required for FH may increase remarkably with an improvement in peak rate. Thus, it has been discussed to enable a portion of the layers implemented on the DU to be realized on the RU to reduce the amount of information transmitted by the FH. Various variations are conceivable as to determining a layer of which the functions are to be realized on the RU. As an example, a method in which all or a portion of the functions of layer 1 included in the DU is realized by the RU and a method in which Layer 1 and portions of Layer 2 are realized on the RU are discussed.

When a portion of the functions of the layers included in the DU is realized on the RU, it is necessary to define an interface between the DU and the RU depending on how functions are shared. However, the interface is not defined in the current 3GPP.

The disclosed technique has been made in view of the above-described circumstance, and an object thereof is to provide a technique of enabling a portion of the functions of layers included in the DU to be realized on the RU in a C-RAN wireless communication network.

Means for Solving Problem

A base station of the disclosed technique is a base station used as a first base station in a wireless communication system including the first base station, a second base station that communicates with the first base station, and a user equipment that communicates with the first base station, the base station including: a reception unit that receives a parameter used for generating a downlink physical data channel and data to be transmitted toward the user equipment from the second base station; a generating unit that generates the downlink physical data channel by performing processing of Layer 1 on the data using the parameter; and a transmission unit that transmits the generated downlink physical data channel.

Effect of the Invention

According to the disclosed technique, a technique capable of enabling a portion of the functions of layers included in the DU to be realized on the RU in a C-RAN wireless communication network is provided.

BRIEF DESCRIPTION OF DRAWINGS

FIG. 5 is a diagram illustrating a processing procedure that the wireless communication system according to the embodiment performs;

FIG. 6A is a diagram illustrating a first example of feedback information and DL transmission parameters;

FIG. 6B is a diagram illustrating a first example of feedback information and DL transmission parameters;

FIG. 8B is a diagram illustrating a third example of feedback information and DL transmission parameters;

FIG. 9 is a diagram illustrating an example of a table illustrating a combination pattern of DL transmission parameters;

MODE(S) FOR CARRYING OUT THE INVENTION

Hereinafter, an embodiment of the invention will be described with reference to the drawings. The embodiment to be described below is an example only, and an embodiment to which the invention is applied is not limited to the following embodiment. For example, although a wireless communication system according to the present embodiment is a system of a scheme compatible with LTE, the invention is not limited to LTE but can be applied to other schemes. In the present specification and the claims, "LTE" is used in a broad sense to include 5G communication schemes corresponding to 3GPP release 10, 11, 12, 13, 14, or later as well as communication schemes corresponding to 3GPP release 8 or 9 unless otherwise stated particularly.

In the following description, 1 TTI is used to mean a minimum unit of scheduling. Moreover, although one subframe is used assuming that it has the same length as 1 TTI, the subframe is not intended to be limited thereto but may be replaced with other units.

"Layer 1" and "physical layer" have the same meaning. Moreover, Layer 2 includes a MAC (Medium Access Control) sublayer, a RLC (Radio Link Control) sublayer, and a PDCP (Packet Data Convergence Protocol) sublayer.

5G Physical Channel Configuration

First, a configuration of a physical channel discussed in 5G will be described. A pilot signal and a reference signal are used in the same meaning.

Figure 1:
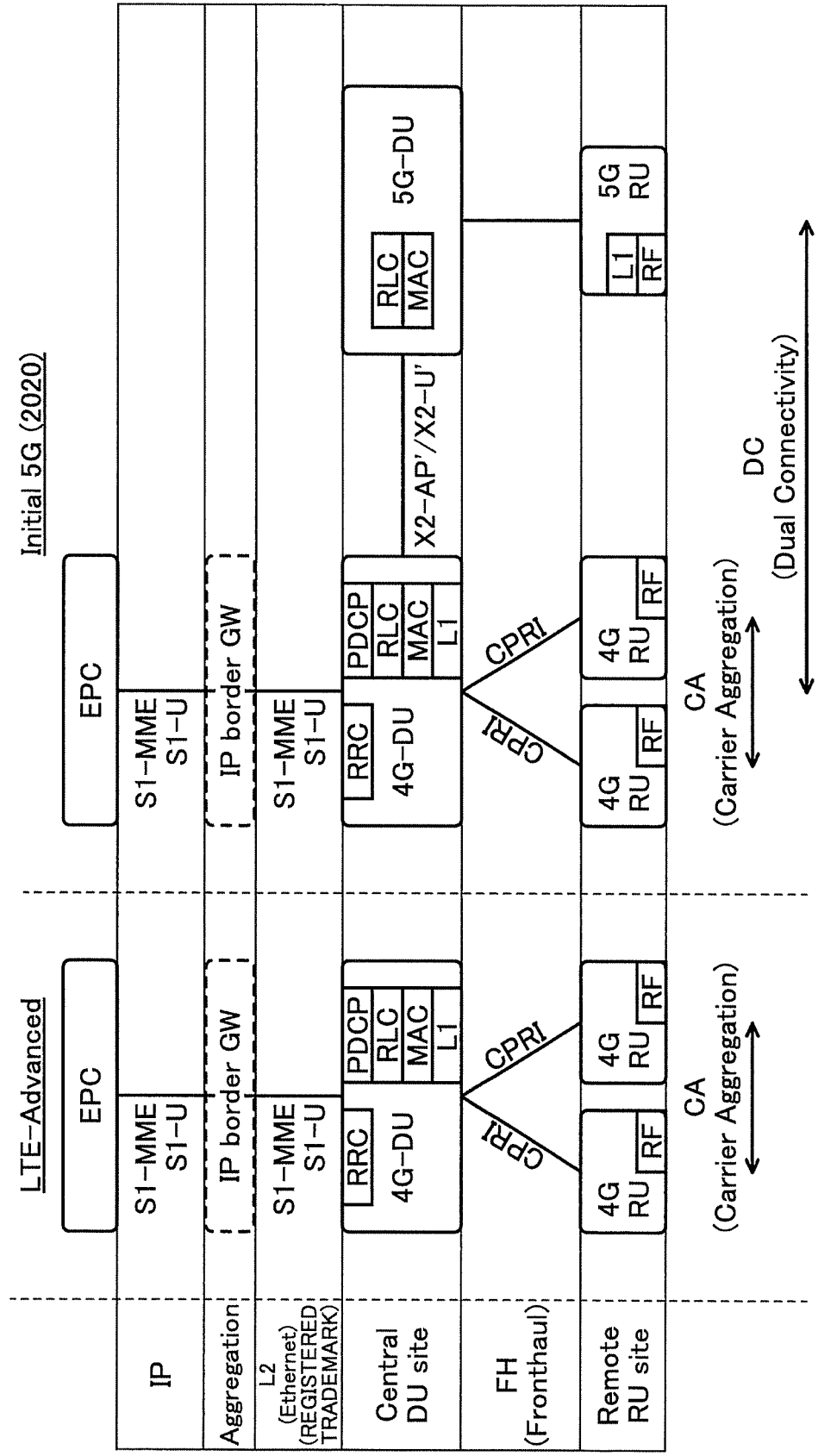
FIG. 1 is a diagram illustrating a configuration example of a C-RAN discussed in 5G.
Figure 2A:
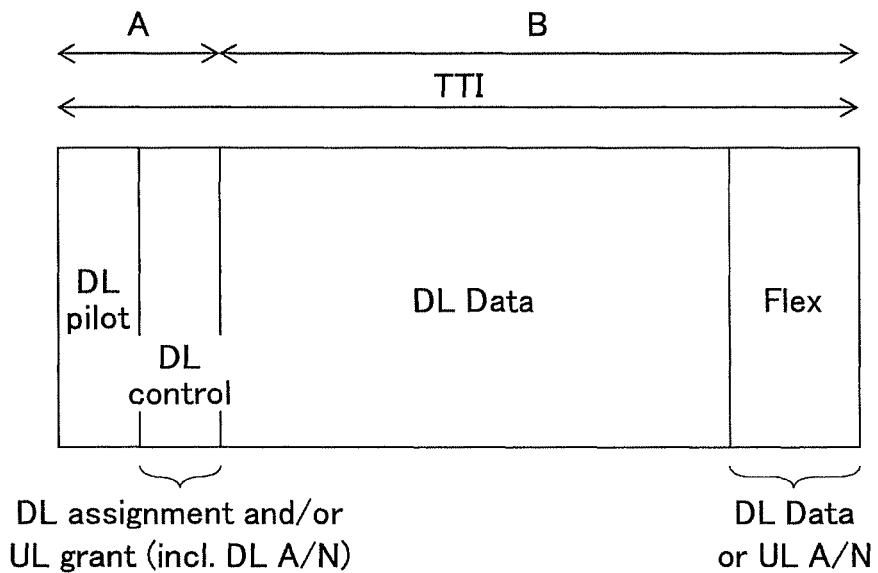
FIG. 2A is a diagram illustrating a configuration example of a physical channel discussed in 5G.
Figure 2B:
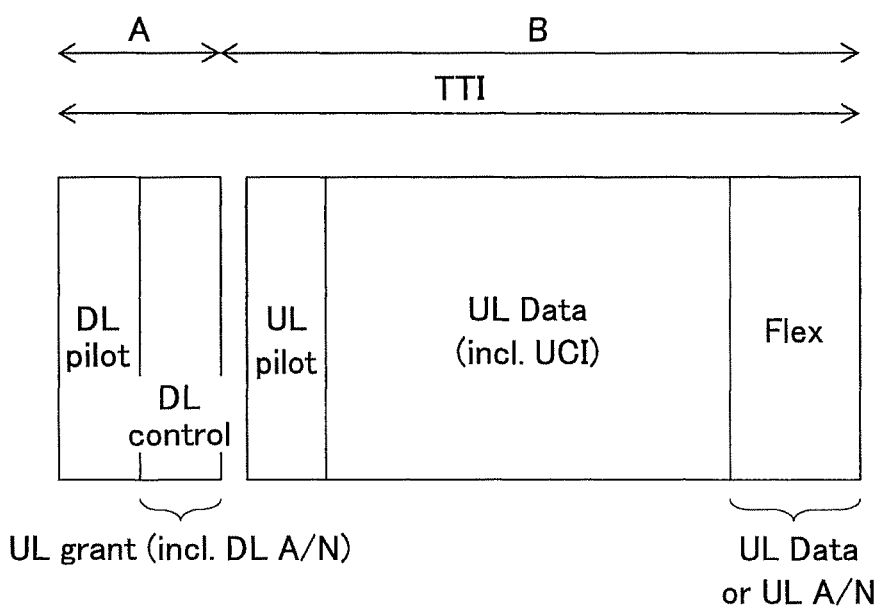
FIG. 2B is a diagram illustrating a configuration example of a physical channel discussed in 5G.

FIG. 2A and FIG. 2B are diagrams illustrating a configuration example of a physical channel discussed in 5G. As illustrated in FIG. 2A and FIG. 2B, it has been proposed that a radio frame used in 5G communication between a base station eNB and a user equipment UE has, within 1 TTI, an area (Area "A" in FIG. 2A and FIG. 2B) to which a pilot signal and a downlink control signal are mapped and an area (Area "B" in FIG. 2A and FIG. 2B) to which data is mapped mainly.

The Area "A" is divided into a pilot signal area (DL pilot) to which a downlink pilot signal is mapped and a control signal area (DL Control) to which a downlink control signal is mapped. The downlink control signal mapped to the control signal area is a signal that includes various control signals such as scheduling information or a UL grant like DCI (Downlink Control Information), for example. Moreover, the control signal includes use information indicating the use of a multi-use area to be described later.

The area "B" is divided into a data area to which DL Data or UL Data is mapped in units of TBs (Transport Blocks) and a multi-use area (Flex). In 5G, application of dynamic TDD (Time Division Duplex) in which uplink and downlink are dynamically switched in units of TTIs has been discussed. In this way, it is possible to freely switch whether a data area and a multi-use area are used for transmission of DL data or UL data using the downlink control signal mapped to the control signal area. For example, a use method in which DL data is mapped to a data area when DL scheduling information (DL assignment) is included in the downlink control signal and UL data is mapped to a data area when UL scheduling information (UL grant) is included in the downlink control signal has been discussed.

Moreover, the multi-use area can be used for a portion of a data area and can be also used for transmission of ACK/NACK (A/N) to DL data. Furthermore, the multi-use area can be used for transmission of a pilot signal or for a guard period.

FIG. 2A illustrates a configuration example of a physical channel when DL data is mapped to a data area and FIG. 2B illustrates a configuration example of a physical channel when UL data is mapped to a data area. When UL data is mapped to a data area, as illustrated in FIG. 2B, mapping an uplink pilot signal (UL pilot) to the start of a data area has been discussed. Moreover, the UL data may include an uplink control signal (UCI (Uplink Control Information)).

Since various procedures or combinations are conceivable regarding a configuration of time division multiplexing (TDM) of a plurality of signals (channels), the invention is not necessarily limited to the procedure or combination illustrated in FIG. 2A and FIG. 2B.

Although it is assumed that the vertical axis of FIG. 2A and FIG. 2B is a frequency axis, the vertical axis is not limited to the entire band but may be a portion of the band. This is because 5G also discusses dividing the entire band into a plurality of subbands and multiplexing radio frames having different TTI lengths according to frequency division multiplexing (FDM). Moreover, it is assumed that, when dynamic TDD is employed, downlink and uplink are switched in units of entire band or subbands.

Since the configuration of the 5G physical channel described above is still in discussion, the present embodiment is not limited to the configuration of the physical channel illustrated in FIG. 2A and FIG. 2B but may be applied to any configuration. Moreover, in the following configuration, FIG. 2A and FIG. 2B are referenced as necessary. However, the present embodiment is not intended to be applied to the channel configuration illustrated in FIG. 2A and FIG. 2B only.

System Configuration

Figure 3:
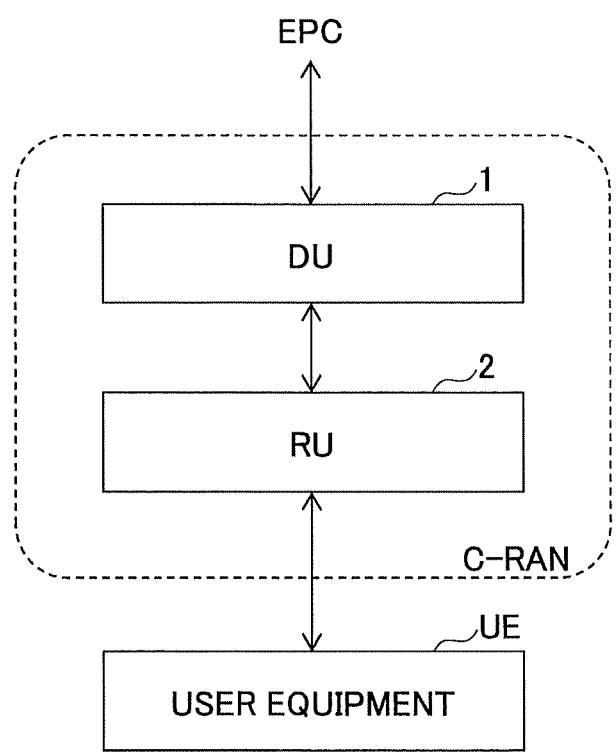
FIG. 3 is a diagram illustrating a system configuration example of a wireless communication system according to an embodiment.

FIG. 3 is a diagram illustrating a system configuration example of a wireless communication system according to an embodiment. As illustrated in FIG. 3, the wireless communication system according to the present embodiment includes a DU 1, a RU 2, and a user equipment UE. In FIG. 3, although one RU 2 is illustrated, two or more RUs 2 may be included. That is, the DU 1 may be configured to control a plurality of RUs 2.

The DU 1 may be referred to as a central digital unit and may be referred to as a base band unit (BBU). Moreover, the DU 1 may be referred to as a central base station and may be referred to simply as a base station (eNB: enhanced Node B).

The RU 2 may be referred to as a remote radio unit (RRU) and may be referred to as a RAU (Remote Antenna Unit), and may be referred to as a RRH (Remote Radio Head). Moreover, the RU 2 may be referred to as a remote base station and may be referred to simply as a base station.

In the wireless communication system according to the present embodiment, a predetermined signal is transmitted and received between the DU 1 and the RU 2 via a FH, and a portion of the functions of the layer included in the DU 1 is realized by the RU 2.

Sharing of Functions Between DU and RU

Figure 4:
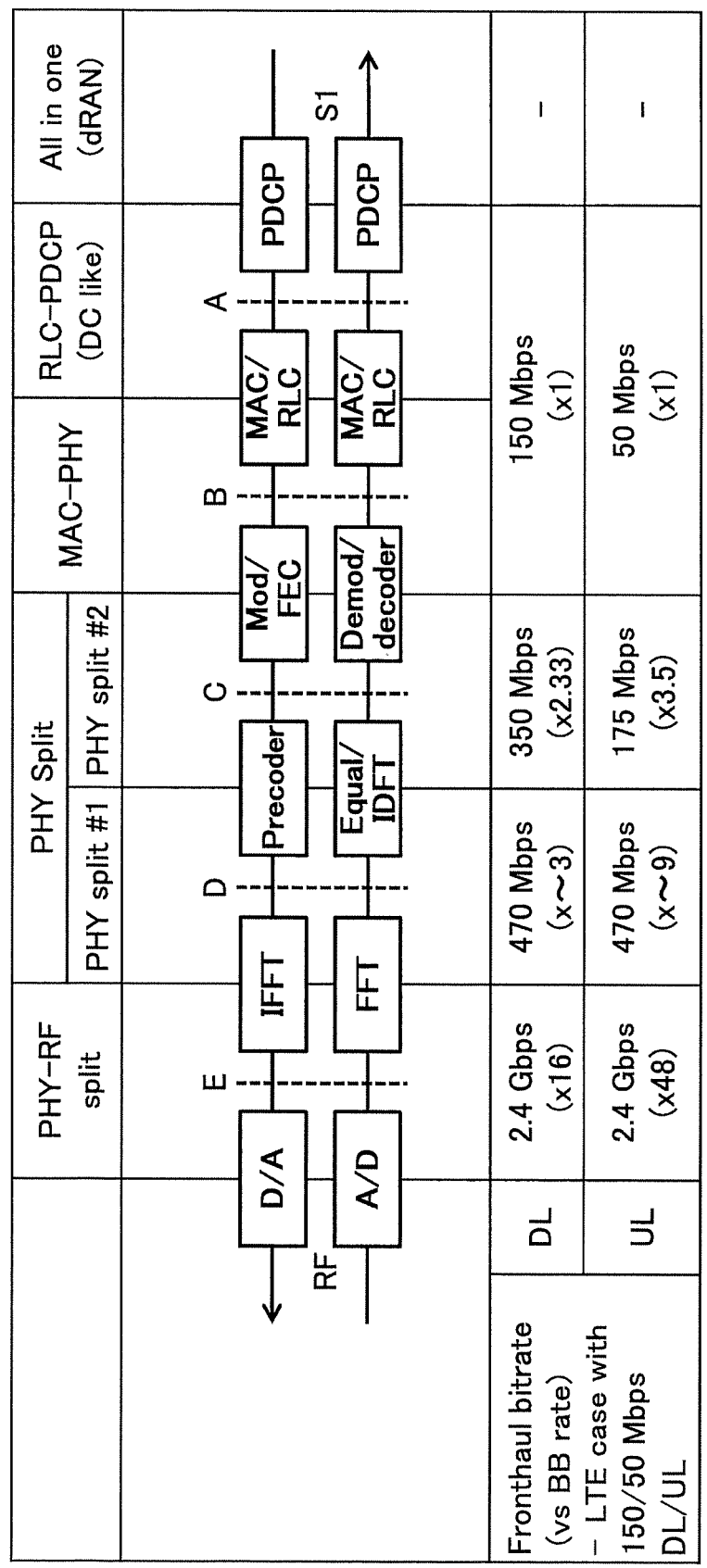
FIG. 4 is a diagram for describing an example of how the functions of a DU and a RU are shared.

FIG. 4 is a diagram for describing an example of how the functions of the DU and the RU are shared. The boundaries "A" to "E" in FIG. 4 indicate the boundaries between the functions implemented in the DU 1 and the RU 2. For example, when functions are shared based on the boundary "B," it means that the functions of Layers 2 and higher are implemented on the DU 1 side and the functions of Layer 1 are implemented on the RU2 side. When functions are shared based on the boundary "E," it corresponds to a configuration in which the functions of Layers 1 and higher are implemented on the DU 1 side and the DU 1 and the RU 2 are connected using the CPRI.

FIG. 4 also illustrates an example of bit rates required for the FH for each boundary. For example, it is assumed that the DU 1 supports 150 Mbps (DL) and 50 Mbps (UL). In this case, when functions are shared based on the boundary "A" or "B," the band required for the FH is 150 Mbps (DL) and 50 Mbps (UL). Moreover, when functions are shared based on the boundary "C," the band required for the FH is 350 Mbps (DL) and 175 Mbps (UL). Similarly, when functions are shared based on the boundary "D," the band required for the FH is 470 Mbps (DL) and 470 Mbps (UL). On the other hand, when functions are shared based on the boundary "E," the band required for the FH is 2.4 Gbps (DL) and 2.4 Gbps (UL).

The wireless communication system according to the present embodiment may be configured to support sharing of functions based on any one of the boundaries "A" to "E" and may be configured to support sharing of functions based on different boundaries for UL and DL. In the following description, it is assumed that functions are shared based on any one of the boundaries "B," "C," and "D" for UL and DL.

Processing Procedure

Transmission of DL Physical Data Channel

FIG. 5 is a diagram illustrating a processing procedure that a wireless communication system according to the embodiment performs. With reference to FIG. 5, a processing procedure when the RU 2 transmits a DL physical data channel toward the user equipment UE particularly using MIMO (multiple-input and multiple-output) will be described. FIG. 5 illustrates processing procedures particularly related to the present embodiment only and also includes a processing procedure (for example, transmission of a control channel) (not illustrated) for transmitting a DL physical data channel.

In step S11, the user equipment UE transmits a UL physical control channel or a UL physical data channel to the RU 2 by inserting feedback information indicating DL radio quality or the like. A specific example of the feedback information will be described later. In LTE, the UL physical control channel and the UL physical data channel are referred to as a PUCCH (Physical Uplink Control Channel) and a PUSCH (Physical Uplink Shared Channel), respectively. Moreover, in 5G, the UL physical control channel and the UL physical data channel correspond to "UL Data" in FIG. 2, for example.

In step S13, the RU 2 transmits the feedback information included in the UL physical control channel or the UL physical data channel received from the user equipment UE to the DU 1 via the FH.

In step S15, the DU 1 transmits various parameters (hereinafter referred to as "DL transmission parameters") necessary for the RU 2 to generate DL physical data channel signals to the RU 2 via the FH together with transmission data (TB: Transport Block). A specific example of the DL transmission parameters will be described later. In LTE, the DL physical data channel is referred to as a PDSCH (Physical Downlink Shared Channel). Moreover, in 5G, the DL physical data channel corresponds to "DL Data" in FIG. 2A, for example.

In step S17, the RU 2 generates a DL physical data channel by performing all or partial processes of Layer 1 on the transmission data (TB) using the DL transmission parameters and transmits the DL physical data channel to the user equipment UE.

It is assumed that the processing procedures of steps S15 and S17 are repeatedly performed at a cycle of 1 TTI. Moreover, it is assumed that steps S11 and S13 are performed at a predetermined cycle of 1 TTI or longer or are performed at a timing at which it is determined that the user equipment UE has to transmit feedback information.

First Example of Feedback Information and DL Transmission Parameters

FIG. 6A and FIG. 6B are diagrams illustrating a first example of feedback information and DL transmission parameters. FIG. 6A and FIG. 6B illustrate an example of feedback information and DL transmission parameters transmitted and received between the DU 1 and the RU 2 when the DU 1 and the RU 2 share functions based on the boundary "B" (that is, the functions of Layers 2 and higher are implemented on the DU 1 and all functions of Layer 1 are implemented on the RU 2).

FIG. 6A illustrates an example of feedback information. As illustrated in FIG. 6A, the feedback information includes radio quality measurement information and delivery confirmation information, for example. The "radio quality measurement information" stores "information indicating recommendation value (recommendation value as seen from user equipment UE) of radio parameter to be applied to DL physical data channel" (in LTE, channel state notification (CSI: Channel State Information)), estimated by the user equipment UE based on radio quality of DL signals. The "delivery confirmation information" stores ACK/NACK of HARQ (Hybrid Automatic Repeat Request). The expression "recommendation value" is used because LTE defines that a base station eNB does not necessarily need to follow the recommendation value from a user equipment UE when transmitting a DL physical data channel.

The "information indicating recommendation value of radio parameter to be applied to DL physical data channel" is, for example, all or some of information indicating a recommendation value of the number of layers (in LTE, a rank indicator (RI)), information indicating a recommended precoding matrix (in LTE, a precoding matrix indicator (PMI)), and information indicating a recommended modulation scheme and coding rate (in LTE, channel quality information (CQI: Channel Quality Indicator)).

The radio quality measurement information is not limited to the "information indicating recommendation value of radio parameter to be applied to DL physical data channel" but may be information indicating radio quality itself of DL signals measured by the user equipment UE. For example, the radio quality measurement information may be SIR (Signal to Interference Radio), RSRQ (Reference Signal Received Quality), RSRP (Reference Signal Received Power), and RSSI (Received Signal Strength Indicator).

FIG. 6B illustrates an example of DL transmission parameters. As illustrated in FIG. 6B, the DL transmission parameters include, for example, a UE identifier, a transmission data size (TBS: Transport Block Size), a cell unique ID, a modulation scheme, a coding rate, a redundancy version (RV), the number of layers, precoding information, allocation resource information, and other channel resource configuration information.

The UE identifier is an identifier for uniquely identifying user equipments UEs, and in LTE, is referred to as a RNTI (Radio Network Temporary Identity). The UE identifier is mainly used for scrambling in Layer 1. The transmission data size (TBS) indicates a data size of TB to be transmitted to the user equipment UE. The cell unique ID is the ID unique to a cell in which a DL physical data channel is transmitted, and in LTE, is referred to as a PCI (Physical Cell Identifier). The modulation scheme indicates a modulation scheme used for modulation of Layer 1. The coding rate indicates a coding rate applied to coding (Channel coding) of Layer 1. The redundancy version indicates a redundancy version of data to be transmitted when the data is retransmitted by HARQ. The number of layers indicates the number of layers used for layer mapping of Layer 1. The precoding information indicates a precoding matrix used for precoding of Layer 1. The allocation resource information is information indicating a resource block (RB) to which signals (signals generated by precoding) to be transmitted from each antenna port are to be mapped and is used for resource allocation (resource element mapping) of Layer 1. The allocation resource information includes the number of RBs and information indicating the location of RB resources, for example.

The other channel resource configuration information is information indicating the location of resources allocated to a channel other than the DL physical data channel and is used for resource allocation of Layer 1. The channel other than the DL physical data channel is a DL physical control channel and a reference signal (RS), for example. In LTE, the DL physical control channel is allocated to one to three symbols at the start of a subframe. On the other hand, in 5G, it is assumed that the DL physical data channel is allocated to the area "A" in FIG. 2A and FIG. 2B, for example. Moreover, in LTE, the reference signal is mapped to a resource element (RE) determined in advance by the standard specification among a plurality of REs that forms a RB. On the other hand, although in 5G, it is assumed that the reference signal is allocated to the area "A" in FIG. 2A and FIG. 2B, the reference signal may be allocated to a portion of a plurality of resource elements that forms "DL Data". The RU 2 is operated to map signals to be transmitted from each antenna port according to the allocation resource information so that the signals are mapped to a resource at least other than the resource allocated to the channel other than the DL physical data channel.

While the DL transmission parameters have been described, this is an example only, and not all of the UE identifier, the transmission data size, the cell unique ID, the modulation scheme, the coding rate, the redundancy version, the number of layers, the precoding information, the allocation resource information, and the other channel resource configuration information may be stored. For example, some (the other channel resource configuration information or the like) of the DL transmission parameters may be defined in advance as standard specifications.

Second Example of Feedback Information and DL Transmission Parameters

Figure 7A:
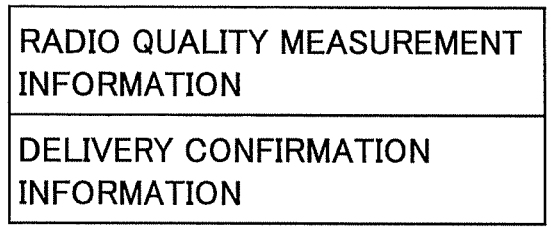
FIG. 7A is a diagram illustrating a second example of feedback information and DL transmission parameters.
Figure 7B:
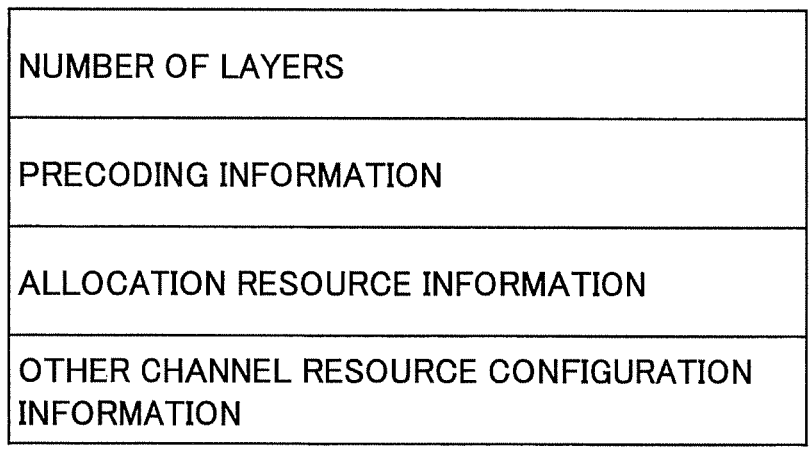
FIG. 7B is a diagram illustrating a second example of feedback information and DL transmission parameters.

FIG. 7A and FIG. 7B are diagrams illustrating a second example of feedback information and DL transmission parameters. FIG. 7A and FIG. 7B illustrate an example of feedback information and DL transmission parameters transmitted and received between the DU 1 and the RU 2 when the DU 1 and the RU 2 share functions based on the boundary "C" (that is, a portion (higher than modulation) of the functions of Layer 1 and the functions of Layers 2 and higher are implemented on the DU 1 and a portion (lower than layer mapping and precoding) of the functions of Layer 1 is implemented on the RU 2).

Since the feedback information illustrated in FIG. 7A is the same as that of FIG. 6A, the description thereof will be omitted. When the DU 1 and the RU 2 share the functions based on the boundary "C," since a portion of the functions of Layer 1 is implemented on the DU 1, the RU 2 cannot directly recognize the feedback information included in the UL physical control channel or the UL physical data channel received from the user equipment UE. Due to this, in the processing procedure of step S13 of FIG. 5, signals before decoding, including the feedback information are transmitted from the RU 2 to the DU 1 as received.

The DL transmission parameter illustrated in FIG. 7B includes the number of layers, the precoding information, the allocation resource information, and the other channel resource configuration information, for example. Since the number of layers, the precoding information, the allocation resource information, and the other channel resource configuration information are the same as those of FIG. 6B, the description thereof will be omitted.

Third Example of Feedback Information and DL Transmission Parameters

Figure 8A:
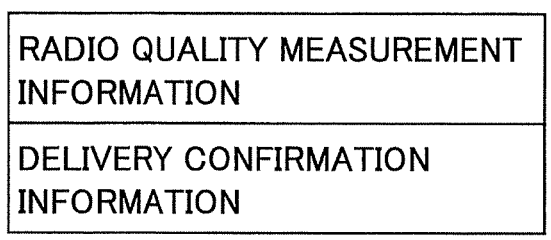
FIG. 8A is a diagram illustrating a third example of feedback information and DL transmission parameters.

FIG. 8A and FIG. 8B are diagrams illustrating a first example of feedback information and DL transmission parameters. FIG. 8A and FIG. 8B illustrate an example of feedback information and DL transmission parameters transmitted and received between the DU 1 and the RU 2 when the DU 1 and the RU 2 share functions based on the boundary "D" (that is, a portion (higher than layer mapping and precoding) of the functions of Layer 1 and the functions of Layers 2 and higher are implemented on the DU 1 and a portion (lower than resource allocation) of the functions of Layer 1 is implemented on the RU 2).

Since the feedback information illustrated in FIG. 8A is the same as that of FIG. 6A, the description thereof will be omitted. When the DU 1 and the RU 2 share the functions based on the boundary "D," since a portion of the functions of Layer 1 is implemented on the DU 1, the RU 2 cannot directly recognize the feedback information included in the UL physical control channel or the UL physical data channel received from the user equipment UE. Due to this, in the processing procedure of step S13 of FIG. 5, signals before decoding, including the feedback information are transmitted from the RU 2 to the DU 1 as received.

The DL transmission parameters illustrated in FIG. 8B includes the allocation resource information and the other channel resource configuration information, for example. Since the allocation resource information and the other channel resource configuration information are the same as those of FIG. 6B, the description thereof will be omitted.

Modification of Processing Procedure

In the present embodiment, the processing procedures to be described below may be used in order to reduce the amount of data transmitted and received via the FH. The plurality of modifications to be described below may be arbitrarily combined.

First Modification

In a first modification of the processing procedure, when the RU 2 itself can predict DL transmission parameters to be used for transmission of the DL physical data channel, information related to the predictable parameters is not transmitted and received between the DU 1 and the RU 2.

As specific example 1-1, the RU 2 transmits the feedback information to be transmitted in the processing procedure of step S13 in FIG. 5 to the DU 1 without inserting "information indicating a recommended precoding matrix" therein. Moreover, the DU 1 transmits the DL transmission parameters to be transmitted in the processing procedure of step S15 to the RU 2 without inserting "information indicating a precoding matrix" therein. The RU 2 generates DL physical data channel signals by performing precoding according to the "information indicating the recommended precoding matrix" received from the user equipment UE. In this way, since it is not necessary to transmit and receive the "information indicating the recommended precoding matrix" and the "information indicating the precoding matrix" between the DU 1 and the RU 2, the amount of data transmitted and received via the FH is reduced.

Second Modification

In a second modification of the processing procedure, information related to parameters that can be predicted based on other parameters among various parameters included in the DL transmission parameters is not transmitted and received between the DU 1 and the RU 2.

As specific example 2-1, the DU 1 transmits the "allocation resource information" of the DL transmission parameters to be transmitted in the processing procedure of step S15 to the RU 2 by inserting "information indicating the location of RB resources" only therein (that is, without inserting "the number of RBs"). The RU 2 predicts the number of RBs using the information indicating the location of RB resources. For example, when information "0-th to 7-th RBs" is stored in the "allocation resource information," the RU 2 can predict that the number of RBs is "8". Due to this, the amount of data transmitted and received via the FH is reduced.

As specific example 2-2, when transmitting the DL transmission parameters directed to each user equipment UE at a certain TTI in the processing procedure of step S15, the DU 1 may insert the "cell unique ID" or/and the "other channel resource configuration information" for the DL transmission parameters directed to a freely-selected single user equipment UE and may not insert the "cell unique ID" or/and the "other channel resource configuration information" for the DL transmission parameters directed to the other user equipments UEs. Since the "cell unique ID" and the "other channel resource configuration information" are common to the respective user equipments UEs, the RU 2 can use the "cell unique ID" and the "other channel resource configuration information" received once before when generating the DL physical data channel directed to the respective user equipments UEs. In this way, the amount of data transmitted and received via the FH is reduced.

As specific example 2-3, the DU 1 transmits the "allocation resource information" of the DL transmission parameters to be transmitted in the processing procedure of step S15 to the RU 2 without inserting the "modulation scheme" therein. Moreover, the RU 2 determines the modulation scheme based on the "transmission data size (TBS)" and the "number of RBs" included in the "allocation resource information". The modulation scheme can be uniquely determined based on the number of RBs and the TBS. For example, LTE defines that the modulation scheme is uniquely determined from the number of RBs and the TBS using Table 7.1.7.2.1 and Table 7.1.7.1-1(A) of TS36.213 V12.4.0 (2014-12). In this way, the amount of data transmitted and received via the FH is reduced.

Third Modification

In a third modification of the processing procedure, parameters of which the past setting values can be used among various parameters included in the DL transmission parameters are not transmitted and received between the DU 1 and the RU 2.

As specific example 3-1, when transmitting the DL transmission parameters in the processing procedure of step S15, the DU 1 may insert the "other channel resource configuration information" in the first execution (for example, when the processing procedure of step S15 is executed first time after the system is activated) and may not insert the "other channel resource configuration information" to the DL transmission parameters in the subsequent executions. When the "other channel resource configuration information" is common to all user equipments UEs and does not change, the RU 2 can use the "other channel resource configuration information" received once before when generating the display characteristics directed to the respective user equipments UEs. In this way, the amount of data transmitted and received via the FH is reduced.

As specific example 3-2, when transmitting the DL transmission parameters in the processing procedure of step S15, the DU 1 inserts the "precoding information" when changing the precoding information only. The RU 2 performs precoding using the most recently received "precoding information" when the "precoding information" is not included in the DL transmission parameters. Since the "precoding information" is basically information that the DU 1 determines based on the feedback information (information indicating the recommended precoding matrix) from the user equipment UE and is basically not changed unless there is a feedback from the user equipment UE, the RU 2 can use the most recently received "precoding information". In this way, the amount of data transmitted and received via the FH is reduced.

As specific example 3-3, when performing retransmission in a HARQ process, the DU 1 does not insert transmission data (TB) in the processing procedure of step S15. The RU 2 generates retransmission data by itself using the setting value of the redundancy version and the transmission data (TB) received previously. In this way, the amount of data transmitted and received via the FH is reduced.

Fourth Modification

In a fourth modification of the processing procedure, a table in which a combination pattern of the values set to the DL transmission parameters and an index value that uniquely specifies the combination pattern are correlated is retained in advance in the DU 1 and the RU 2. Moreover, when transmitting the DL transmission parameters in the processing procedure of step S15, the DU 1 transmits an index value instead of the specific parameter values. The RU 2 generates the DL physical data channel using the values of the parameters corresponding to the received index value (by reading the same from the table).

FIG. 9 is a diagram illustrating an example of a table illustrating a combination pattern of DL transmission parameters. In the example of FIG. 9, combination patterns of the values set to the number of RBs, the modulation scheme, and the transmission data size (TBS) are correlated with index values. For example, for index "1," the number of RBs is "4," the modulation scheme is "QPSK," and the transmission data size (TBS) is "56 bits".

When the table illustrated in FIG. 9 is used, the values of "number of RBs," "modulation scheme" and "transmission data size (TBS)" among the DL transmission parameters can be replaced with one index value. In this way, the amount of data transmitted and received via the FH is reduced.

The table illustrated in FIG. 9 is an example only, and parameters other than those illustrated in FIG. 9 may be included. Moreover, the respective parameters may be managed by one table and may be divided and managed by a plurality of tables.

Fifth Modification

When a DL physical data channel is transmitted, "downlink control information" indicating the location of a radio resource among the radio resources of the entire DL physical data channel, at which data is mapped and a modulation scheme or the like used for mapping the data is transmitted in advance to each user equipment UE. For example, in LTE, a PDCCH for transmitting the downlink control information (DCI) is mapped to the first to third symbols at the start of each subframe and a PDSCH is mapped to the subsequent symbols. Moreover, in 5G, as illustrated in FIG. 2A, it is assumed that "DL control" is mapped before "DL Data".

Therefore, in a fifth modification of the processing procedure, the DU 1 transmits DL transmission parameters to the RU 2 without inserting the parameters included in the downlink control information corresponding to the DL physical data channel and the RU 2 generates the DL physical data channel using the parameters included in the downlink control information.

Since the downlink control information includes the modulation scheme, the coding rate, the redundancy version, the number of layers, the precoding information, and the allocation resource information, for example, it is possible to eliminate these parameters from the DL transmission parameters. In this way, the amount of data transmitted and received via the FH is reduced.

Sixth Modification

As described above, it is assumed that the processing procedures of steps S15 and S17 in FIG. 5 are repeatedly performed at a cycle of 1 TTI.

Therefore, the DU 1 may transmit a difference from the previous DL transmission parameters when transmitting the DL transmission parameters in the processing procedure of step S15. For example, it is expected that, when TB is continuously transmitted to the same user equipment UE over a plurality of TTIs, the need to change the number of RBs and the modulation scheme in respective TTIs is low. Therefore, by transmitting the difference only, it is possible to reduce the amount of data transmitted and received via the FH.

Seventh Modification

When the radio quality measurement information of the feedback information includes "information indicating radio quality of DL signal measured by user equipment UE" (SIR or the like), the RU 2 may store an index value (a quantized value) determined in advance between the DU 1 and the RU 2 rather than storing the measured numerical value itself (true value). The index value may be a CQI value transmitted from the user equipment UE.

Similarly, the DU 1 may store an index value (a quantized value) determined in advance between the DU 1 and the RU 2 in the "precoding information" of the DL transmission parameters rather than storing the precoding matrix itself (true value). Moreover, the index value may be PMI.

A seventh modification may be used depending on the type of the user equipment UE, a time period, the degree of congestion of traffics in a cell, and the like. For example, the DU 1 may transmit the true value of the "precoding information" to the RU 2 for the user equipment UE which requires high throughput and may transmit the index value (a quantized value) of the "precoding information" to the RU 2 for the user equipment UE which does not require high throughput.

Functional Configuration (DU)

Figure 10:
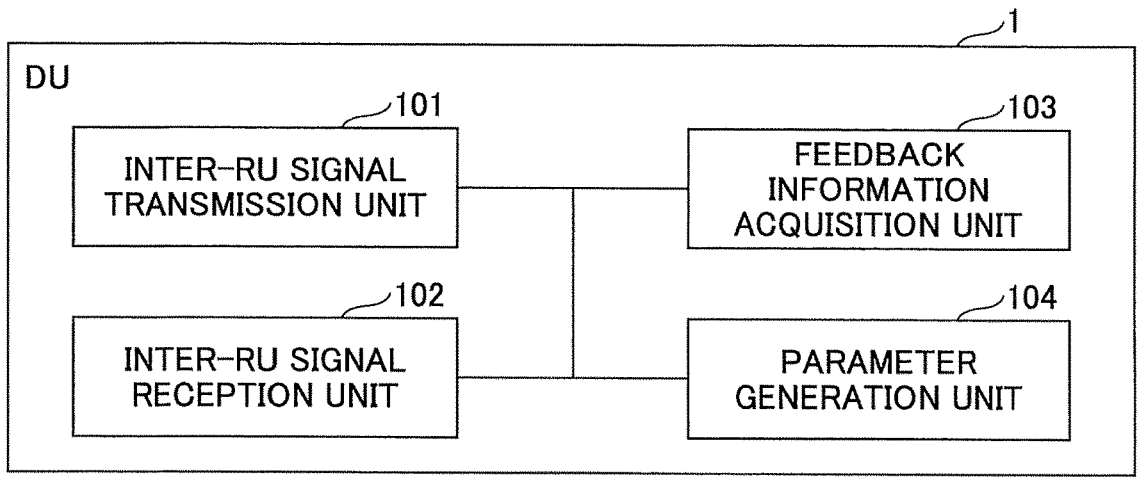
FIG. 10 is a diagram illustrating a functional configuration example of a DU according to the embodiment.

FIG. 10 is a diagram illustrating a functional configuration example of a DU according to the embodiment. As illustrated in FIG. 10, the DU 1 includes an inter-RU signal transmission unit 101, an inter-RU signal reception unit 102, a feedback information acquisition unit 103, and a parameter generation unit 104. FIG. 10 illustrates functional units of the DU 1 particularly related to the embodiment only and also includes at least functions (not illustrated) for performing operations compatible with LTE (including 5G). Moreover, the functional configurations illustrated in FIG. 10 are examples only. The functional classifications and the names of the functional units are not particularly limited as long as the operations according to the present embodiment can be executed. However, the functional configurations may be able to execute some (for example, specific one or plural modifications, specific examples, and the like) of the processes of the DU 1 described above.

The inter-RU signal transmission unit 101 includes a function of generating signals by performing the processes of each layer on the data to be transmitted from the DU 1 and transmitting the generated signals to the RU 2 via the FH. The inter-RU signal reception unit 102 includes a function of receiving signals from the RU 2 via the FH and acquiring data by performing the processes of each layer on the received signals. The inter-RU signal transmission unit 101 and the inter-RU signal reception unit 102 include the function of an interface of a predetermined protocol used by the FH.

The feedback information acquisition unit 103 has a function of acquiring feedback information from the user equipment UE via the inter-RU signal reception unit 102. The parameter generation unit 104 has a function of generating DL transmission parameters based on the facility information database and the like acquired by the feedback information acquisition unit 103. Moreover, the parameter generation unit 104 transmits the generated DL transmission parameters to the RU 2 via the inter-RU signal transmission unit 101. The feedback information acquisition unit 103 and the parameter generation unit 104 may be a portion of the functions of the MAC scheduler.

(RU)

Figure 11:
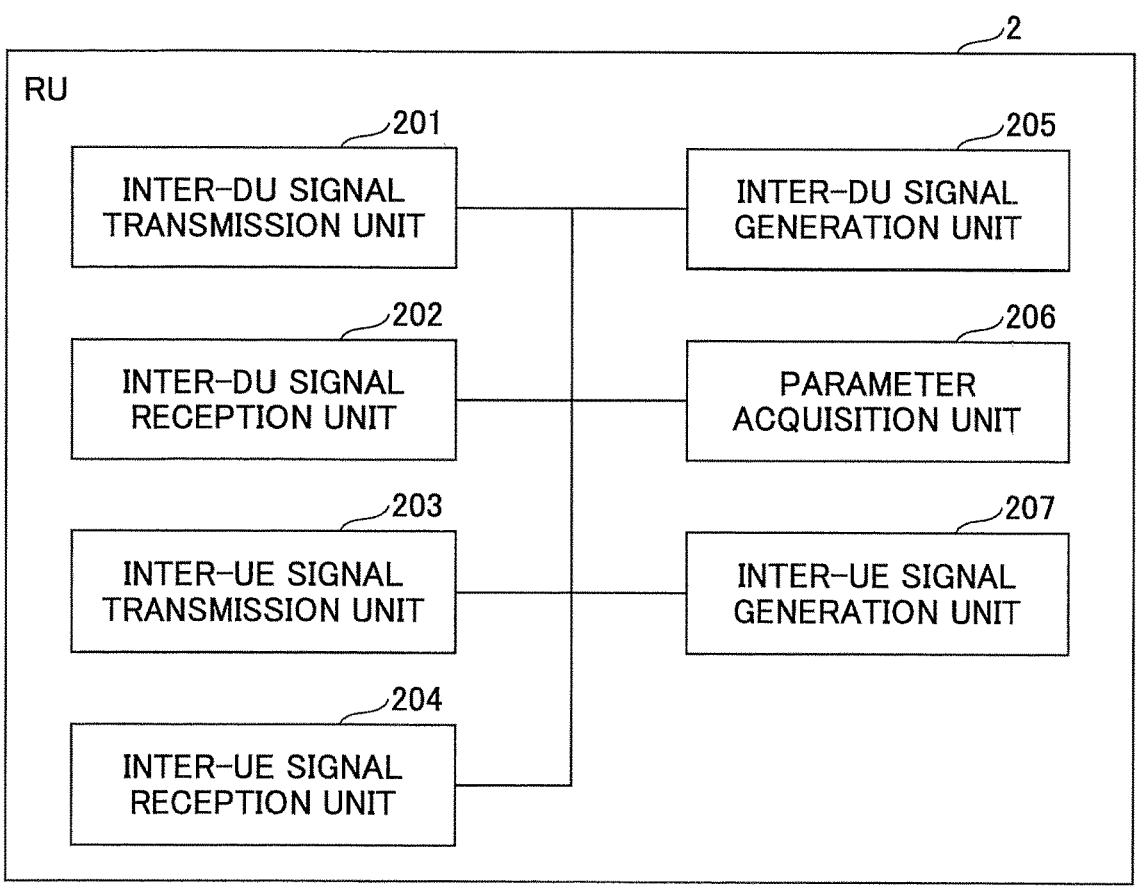
FIG. 11 is a diagram illustrating a functional configuration example of a RU according to the embodiment.

FIG. 11 is a diagram illustrating a functional configuration example of a RU according to the embodiment. As illustrated in FIG. 11, the RU 2 includes an inter-DU signal transmission unit 201, an inter-DU signal reception unit 202, an inter-UE signal transmission unit 203, an inter-UE signal reception unit 204, an inter-DU signal generation unit 205, a parameter acquisition unit 206, and an inter-UE signal generation unit 207. FIG. 11 illustrates functional units of the RU 2 particularly related to the embodiment only and also includes at least functions (not illustrated) for performing operations compatible with LTE (including 5G). Moreover, the functional configurations illustrated in FIG. 11 are examples only. The functional category and the name of the functional unit are not particularly limited as long as the operations according to the present embodiment can be executed. However, the functional configurations may be able to execute some (for example, specific one or plural modifications, specific examples, and the like) of the processes of the RU 2 described above.

The inter-DU signal transmission unit 201 includes a function of transmitting signals generated by the inter-DU signal generation unit 205 to the DU 1 via the FH. The inter-DU signal reception unit 202 includes a function of receiving signals from the DU 1 via the FH. More specifically, the inter-DU signal reception unit 202 includes a function of receiving DL transmission parameters and data (TB) to be transmitted toward the user equipment UE from the DU 1. Moreover, the inter-DU signal transmission unit 201 and the inter-DU signal reception unit 202 include the function of an interface of a predetermined protocol used by the FH.

The inter-UE signal transmission unit 203 includes a function of transmitting radio signals (a DL physical data channel) generated by the inter-UE signal generation unit 207 to the user equipment UE. The inter-UE signal reception unit 204 includes a function of receiving the radio signals from the user equipment UE and delivering the received radio signals to the inter-DU signal generation unit 205.

The inter-DU signal generation unit 205 generates signals to be transmitted toward the DU 1 by performing all or some of the processes of Layer 1 on the radio signals received by the inter-UE signal reception unit 204 and delivers the generated signals to the inter-DU signal transmission unit 201. Moreover, the inter-DU signal generation unit 205 may extract feedback information by performing the processes of Layer 1 on the radio signals received by the inter-UE signal reception unit 204 and may deliver the extracted feedback information to the inter-DU signal transmission unit 201.

The parameter acquisition unit 206 has a function of acquiring the DL transmission parameters included in the signals transmitted from the DU 1 and received by the inter-DU signal reception unit 202. Moreover, the parameter acquisition unit 206 has a function of delivering the acquired parameters to the inter-UE signal generation unit 207.

The inter-UE signal generation unit 207 has a function of generating the DL physical data channel (a function of generating the radio signals of the DL physical data channel) by performing all or some of the processes of Layer 1 on the data (TB) to be transmitted toward the user equipment UE using the DL transmission parameters.

When predetermined information among a plurality of items of information included in the DL transmission parameters is omitted, the inter-UE signal generation unit 207 may estimate the predetermined information using information other than the predetermined information among the plurality of items of information included in the DL transmission parameters and may generate the DL physical data channel using the estimated predetermined information and the DL transmission parameters in which the predetermined information is omitted. That is, the inter-UE signal generation unit 207 may generate the DL physical data channel according to the processing procedure described in "first modification of processing procedure" or "second modification of processing procedure".

When predetermined information among a plurality of items of information included in the DL transmission parameters is omitted and the omitted predetermined information has been received in the past, the inter-UE signal generation unit 207 may generate the DL physical data channel using the predetermined information received in the past and the DL transmission parameters in which the predetermined information is omitted. That is, the inter-UE signal generation unit 207 may generate the DL physical data channel according to the processing procedure described in "third modification of processing procedure".

The inter-UE signal generation unit 207 may further include a storage unit, and the storage unit may store a table in which an index value and a combination pattern of values set to partial items of information among a plurality of items of information included in the DL transmission parameters are correlated. The storage unit is realized by a memory or an auxiliary storage device. When partial items of information among a plurality of items of information included in the DL transmission parameters are omitted and an index value is included instead of the omitted partial items of information, the inter-UE signal generation unit 207 may generate a DL physical data channel using the DL transmission parameters in which the predetermined information is omitted and the values represented by the combination pattern corresponding to the index value. That is, the inter-UE signal generation unit 207 may generate the DL physical data channel according to the processing procedure described in "fourth modification of processing procedure".

The inter-UE signal generation unit 207 may generate the DL physical data channel using the "information to be transmitted to the user equipment UE as the downlink control information" received by the inter-DU signal reception unit 202. Specifically, when the "information to be transmitted to the user equipment UE as the downlink control information" among the plurality of items of information included in the DL transmission parameters is omitted, the inter-UE signal generation unit 207 may generate the DL physical data channel using the DL transmission parameters in which the information is omitted and the "information to be transmitted to the user equipment UE as the downlink control information" received by the inter-DU signal reception unit 202. That is, the inter-UE signal generation unit 207 may generate the DL physical data channel according to the processing procedure described in "fifth modification of processing procedure".

When a difference from the DL transmission parameters transmitted previously is set to a plurality of items of information included in the DL transmission parameters, the inter-UE signal generation unit 207 may generate the DL physical data channel using the difference and the previously received DL transmission parameters. That is, the inter-UE signal generation unit 207 may generate the DL physical data channel according to the processing procedure described in "sixth modification of processing procedure".

All of the functional configurations of the DU 1 and the RU 2 described above may be realized by a hardware circuit (for example, one or a plurality of IC chips), and portions thereof may be realized by a hardware circuit and the other may be realized by a CPU and a program.

(DU)

Figure 12:
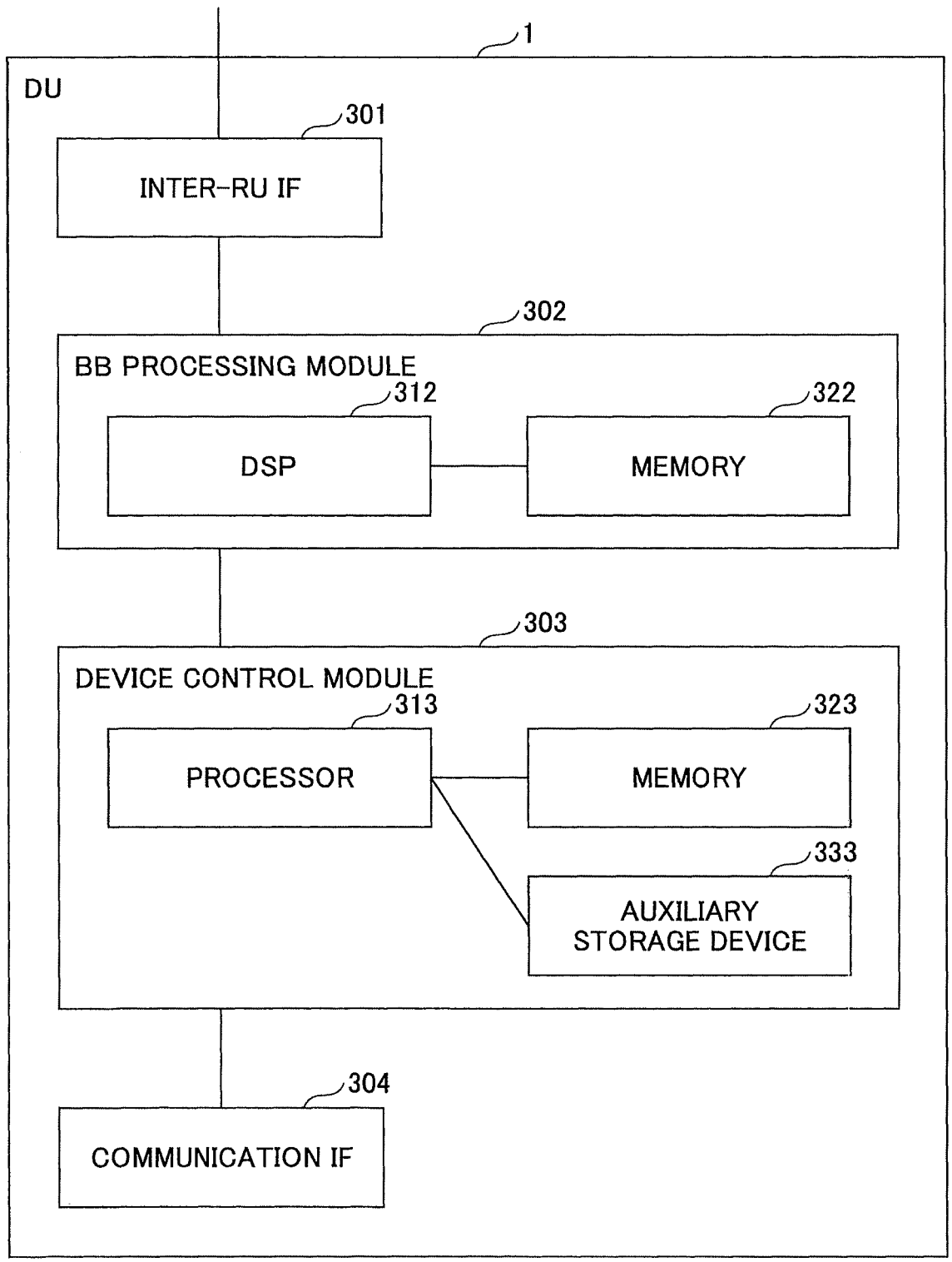
FIG. 12 is a diagram illustrating a hardware configuration example of a DU according to the embodiment.

FIG. 12 is a diagram illustrating a hardware configuration example of the DU according to the embodiment. FIG. 12 illustrates a configuration more similar to an implementation example than FIG. 10. As illustrated in FIG. 12, the DU 1 includes an inter-RU IF 301 which is an interface for connecting to the RU 2, a BB processing module 302 that performs baseband signal processing, a device control module 303 that performs processing of higher layers and the like, and a communication IF 304 which is an interface for connecting to a core network or the like.

The inter-RU IF 301 has a function of connecting a physical line of the FH that connects the DU 1 and the RU 2 and a function of terminating the protocol used by the FH. The inter-RU IF 301 includes a portion of the inter-RU signal reception unit 102 and the inter-RU signal transmission unit 101 illustrated in FIG. 10, for example.

The BB processing module 302 performs a process of converting an IP packet to signals transmitted and received to and from the RU 2 or vice versa. A DSP 312 is a processor that performs signal processing in the BB processing module 302. A memory 322 is used as a work area of the DSP 312. The BB processing module 302 includes the inter-RU signal transmission unit 101, a portion of the inter-RU signal reception unit 102, the feedback information acquisition unit 103, and the parameter generation unit 104 illustrated in FIG. 10, for example.

The device control module 303 performs protocol processing of the IP layer and OAM (Operation and Maintenance) processing. A processor 313 is a processor that performs the processing performed by the device control module 303. A memory 323 is used as a work area of the processor 313. An auxiliary storage device 333 is a HDD, for example, and stores various items of setting information for the DU 1 itself to operate.

(RU)

Figure 13:
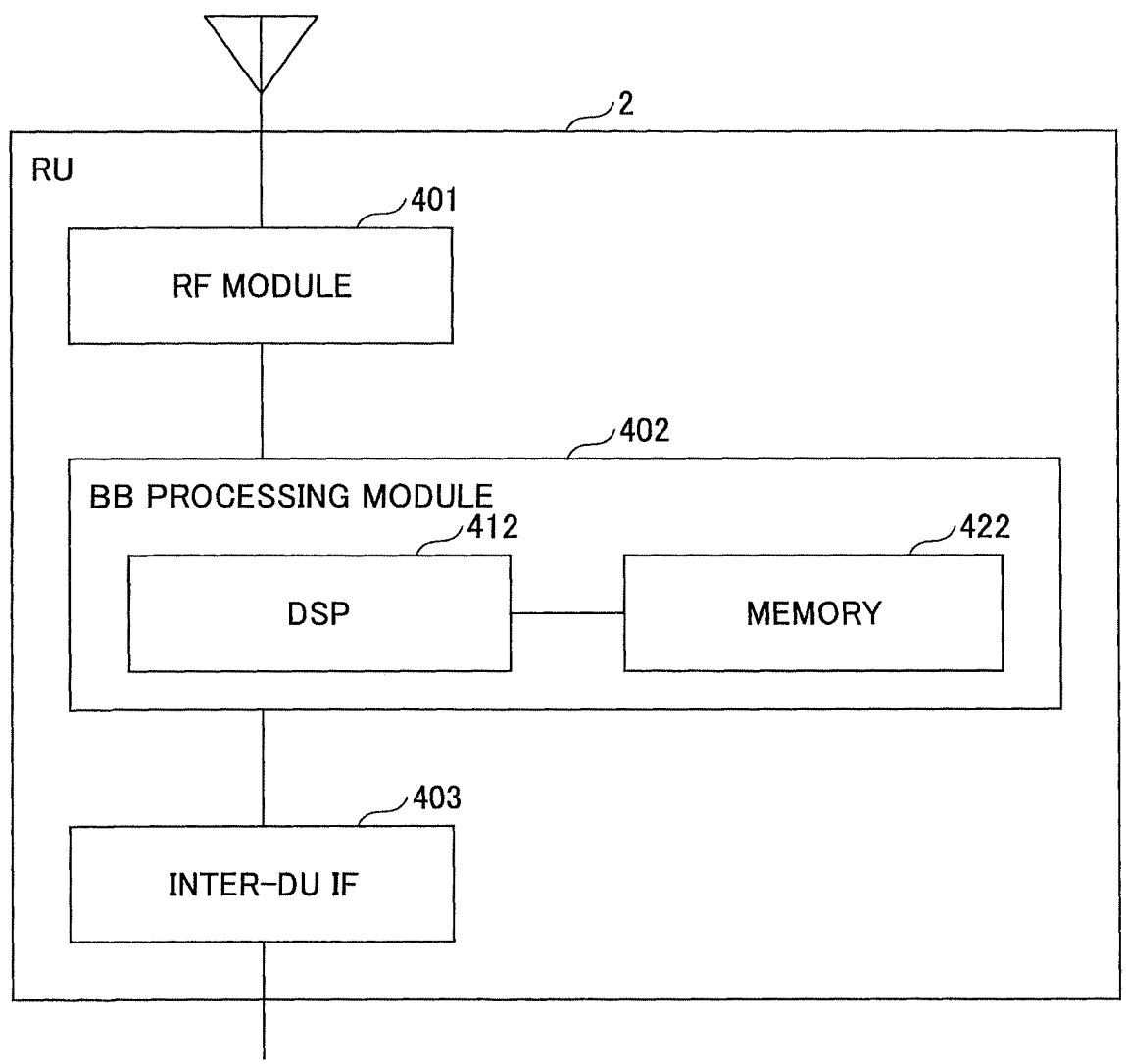
FIG. 13 is a diagram illustrating a hardware configuration example of a RU according to the embodiment.

FIG. 13 is a diagram illustrating a hardware configuration example of the RU according to the embodiment. FIG. 13 illustrates a configuration more similar to an implementation example than FIG. 11. As illustrated in FIG. 13, the RU 2 includes a RF (Radio Frequency) module 401 that performs processing on radio signals, a BB (Base Band) processing module 402 that performs baseband signal processing, and an inter-DU IF 403 which is an interface for connecting to the DU 1.

The RF module 401 generates radio signals to be transmitted from an antenna by performing D/A (Digital-to-Analog) conversion, modulation, frequency conversion, power amplification, and the like on the digital baseband signals received from the BB processing module 402. Moreover, the RF module 401 generates digital baseband signals by performing frequency conversion, A/D (Analog to Digital) conversion, demodulation, and the like on the received radio signals and delivers the generated digital baseband signals to the BB processing module 402. The RF module 401 includes an RF function. The RF module 401 includes the inter-UE signal transmission unit 203 and the inter-UE signal reception unit 204 illustrated in FIG. 11, for example.

The BB processing module 402 performs a process of converting signals transmitted and received to and from the DU 1 via the inter-DU IF 403 to the digital baseband signals or vice versa. A DSP (Digital Signal Processor) 412 is a processor that performs signal processing in the BB processing module 402. A memory 422 is used as a work area of the DSP 412. The BB processing module 402 includes the inter-DU signal generation unit 205, the parameter acquisition unit 206, and the inter-UE signal generation unit 207 illustrated in FIG. 11, for example.

The inter-DU IF 403 has a function of connecting a physical line of the photograph that connects the DU 1 and the RU and a function of terminating the protocol used by the FH. The inter-DU IF 403 includes the inter-DU signal transmission unit 201 and the inter-DU signal reception unit 202 illustrated in FIG. 11, for example.

Summary

According to the embodiment, there is provided a base station used as a first base station in a wireless communication system including the first base station, a second base station that communicates with the first base station, and a user equipment that communicates with the first base station, the base station including: a reception unit that receives a parameter used for generating a downlink physical data channel and data to be transmitted toward the user equipment from the second base station; a generating unit that generates the downlink physical data channel by performing processing of Layer 1 on the data using the parameter; and a transmission unit that transmits the generated downlink physical data channel. Due to this base station, a technique of enabling a portion of the functions of layers included in the DU to be realized on the RU in a C-RAN wireless communication network is provided.

The receiving unit may receive the parameter in which predetermined information among a plurality of items of information included in the parameter is omitted, and the generating unit may estimate the predetermined information using information other than the predetermined information among the plurality of items of information included in the parameter and generate the downlink physical data channel using the received parameter and the estimated predetermined information. In this way, the amount of data transmitted and received between the DU 1 and the RU 2 via the FH is reduced.

The reception unit may receive the parameter in which predetermined information among a plurality of items of information included in the parameter is omitted, and when the omitted predetermined information has been received in the past, the generating unit may generate the downlink physical data channel using the received parameter and the predetermined information received in the past. In this way, the amount of data transmitted and received between the DU 1 and the RU 2 via the FH is reduced.

The base station may include a storage unit that stores a table in which an index value and a combination pattern of values set to partial items of information among a plurality of items of information included in the parameter are correlated, wherein, the reception unit may receive the parameter in which the partial items of information among the plurality of items of information included in the parameter are omitted, and in which the index value is included instead of the omitted partial items of information, and the generating unit may generate the downlink physical data channel using the received parameter and a value represented by the combination pattern corresponding to the index value. In this way, the amount of data transmitted and received between the DU 1 and the RU 2 via the FH is reduced.

The reception unit may receive information to be transmitted to the user equipment as downlink control information and receive the parameter in which the information to be transmitted to the user equipment is omitted as the downlink control information among the plurality of items of information included in the parameter, and the generating unit may generate the downlink physical data channel using the received parameter and the information to be transmitted to the user equipment as the downlink control information. In this way, the amount of data transmitted and received between the DU 1 and the RU 2 via the FH is reduced.

The second base station may perform processing of Layer 2 or processing of Layer 2 and some of Layer 1, and the base station may perform processing of Layer 1 or processing other than the processing of Layer 1 performed by the second base station among the processing of Layer 1. In this way, sharing of the functions between the DU 1 and the RU 2 that form the C-RAN can be changed in various ways.

The parameter may include all or some of an identifier for uniquely identifying the user equipment, a transport block size, a cell unique identifier, a modulation scheme, a coding rate, a redundancy version, the number of layers, precoding information, allocation resource information, and information indicating a location of resources allocated to channels other than the downlink physical data channel. In this way, it is possible to generate the DL physical data channel signals without providing the function of a MAC scheduler or the like to the RU 2.

According to the embodiment, there is provided a transmission method executed by a base station used as a first base station in a wireless communication system including the first base station, a second base station that communicates with the first base station, and a user equipment that communicates with the first base station, the transmission method including: receiving a parameter used for generating a downlink physical data channel and data to be transmitted toward the user equipment from the second base station; generating the downlink physical data channel by performing processing of Layer 1 on the data using the parameter; and transmitting the generated downlink physical data channel. Due to this transmission method, a technique of enabling a portion of the functions of layers included in the DU to be realized on the RU in a C-RAN wireless communication network is provided.

Supplementary Explanation According to Embodiment

The configurations of the devices (the user equipment UE, the DU 1, and the RU 2) described in the embodiment may be realized when a program is executed by a CPU (a processor) in the device including the CPU and the memory. The configurations may be realized by hardware such as a hardware circuit that includes the logics of the processes described in the present embodiment and may be realized by a combination of a program and hardware.

While the embodiment of the invention has been described, the disclosed invention is not limited to such an embodiment, and various variations, modifications, alterations, and substitutions could be conceived by those skilled in the art. While specific examples of numerical values are used in order to facilitate understanding of the invention, these numerical values are examples only and any other appropriate values may be used unless otherwise stated particularly. The classification of items in the description is not essential in the invention, and features described in two or more items may be used in combination, and a feature described in a certain item may be applied to a feature described in another item (unless contradiction occurs). It is not always true that the boundaries of the functional units or the processing units in the functional block diagram correspond to boundaries of physical components. The operations of a plurality of functional units may be physically performed by a single component. Alternatively, the operations of the single functional unit may be physically performed by a plurality of components. The orders in the sequence and the flowchart described in the embodiment may be switched unless contradiction occurs. For convenience of explanation of processing, the user equipment UE, the DU 1, and the RU 2 have been explained using functional block diagrams. However, these devices may be implemented by hardware, software, or a combination thereof. The software that operates by a processor included in the user equipment UE according to the embodiment of the invention, the software that operates by a processor included in the DU 1 according to the embodiment of the invention, and the software that operates by a processor included in the RU 2 according to the embodiment may be stored in a random access memory (RAM), a flash memory, a read only memory (ROM), an EPROM, an EEPROM, a register, a hard disk (HDD), a removable disk, a CD-ROM, a database, a server, and other appropriate storage media.

In the embodiment, the RU 2 is an example of a first base station. The DU 1 is an example of a second base station. The DL physical data channel is an example of a downlink physical data channel. The DL transmission parameter is an example of a parameter used for generating the downlink physical data channel.

Information transmission (notification, reporting) may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC signaling, MAC signaling, broadcast information (MIB (Master Information Block), SIB (System Information Block))), other signals, or combinations thereof. Further, an RRC message may be referred to as RRC signaling. Further, an RRC message may be, for example, an RRC connection setup message, an RRC connection reconfiguration message, or the like.

An aspect/embodiment described in the present specification may be applied to a system that uses LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), other appropriate systems, and/or a next generation system enhanced based thereon.

Determination or judgment may be performed according to a value (0 or 1) represented by a bit, may be performed according to a boolean value (true or false), or may be performed according to comparison of numerical values (e.g., comparison with a predetermined value).

It should be noted that the terms described in the present specification and/or terms necessary for understanding the present specification may be replaced by terms that have the same or similar meaning. For example, a channel and/or a symbol may be a signal. Further, a signal may be a message.

There is a case in which a UE may be referred to as a subscriber station, a mobile unit, subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

An aspect/embodiment described in the present specification may be used independently, may be used in combination, or may be used by switching according to operations. Further, transmission of predetermined information (e.g., transmission of "it is X") is not limited to explicitly-performed transmission. The transmission of predetermined information may be performed implicitly (e.g., explicit transmission of predetermined information is not performed).

As used herein, the term "determining" may encompasses a wide variety of actions. For example, "determining" may be regarded as calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing, comparing and the like. That is, "determining" may be regarded as a certain type of action related to determining.

As used herein, the phrase "based on" does not mean, unless otherwise noted, "based on only". In other words, the phrase "base on" means both "based on only" and "based on at least".

Also, the order of processing steps, sequences or the like of an aspect/embodiment described in the present specification may be changed as long as there is no contradiction. For example, in a method described in the present specification, elements of various steps are presented in an exemplary order. The order is not limited to the presented specific order.

Input/output information, etc., may be stored in a specific place (e.g., memory) or may be stored in a management table. The input/output information, etc., may be overwritten, updated, or added. Output information, etc., may be deleted. Input information, etc., may be transmitted to another apparatus.

Transmission of predetermined information (e.g., transmission of "it is X") is not limited to explicitly-performed transmission. The transmission of predetermined information may be performed implicitly (e.g., explicit transmission of predetermined information is not performed).

Information, a signal, etc., described in the present specification may be represented by using any one of the various different techniques. For example, data, an instruction, a command, information, a signal, a bit, a symbol, a chip or the like described throughout in the present specification may be represented by voltage, current, electromagnetic waves, magnetic fields or a magnetic particle, optical fields or a photon, or any combination thereof.

The present invention is not limited to the above embodiments and various variations, modifications, alternatives, replacements, etc., may be included in the present invention without departing from the spirit of the invention.

The present application is based on and claims the benefit of priority of Japanese Priority Application No. 2016-012527 filed on Jan. 26, 2016, the entire contents of which are hereby incorporated by reference.

EXPLANATIONS OF LETTERS OR NUMERALS

1 DU
2 RU
UE User equipment
101 Inter-RU signal transmission unit
102 Inter-RU signal reception unit
103 Feedback information acquisition unit
104 Parameter generation unit
201 Inter-DU signal transmission unit
202 Inter-DU signal reception unit
203 Inter-UE signal transmission unit
204 Inter-UE signal reception unit
205 Inter-DU signal generation unit
206 Parameter acquisition unit
207 Inter-UE signal generation unit
301 Inter-DU IF
302 BB processing module
303 Device control module
304 Communication IF
401 RF module
402 BB processing module
403 Inter-DU IF

The invention claimed is:

1. A base station comprising:
a receiver that receives a parameter and data from a second base station,
wherein the parameter is used for generating a downlink physical data channel and the data is to be transmitted toward a terminal;
a processor that generates the downlink physical data channel by performing processing of Layer 1 on the data using the parameter; and
a transmitter that transmits the generated downlink physical data channel,
wherein the base station is used as a first base station in a 5G wireless communication system including the first base station, the second base station that communicates with the first base station, and the terminal that communicates with the first base station,
wherein the first base station and the second base station belong to the 5G wireless communication system, and
wherein the second base station does not directly communicate with the terminal.

2. The base station according to claim 1, wherein
the receiver receives the parameter in which predetermined information among a plurality of items of information included in the parameter is omitted, and
the processor estimates the predetermined information using information other than the predetermined information among the plurality of items of information included in the parameter and generates the downlink physical data channel using the received parameter and the estimated predetermined information.

3. The base station according to claim 1, wherein
the receiver receives the parameter in which predetermined information among a plurality of items of information included in the parameter is omitted, and
when the omitted predetermined information has been received in the past, the processor generates the downlink physical data channel using the received parameter and the predetermined information received in the past.

4. The base station according to claim 1, further comprising:

a memory that stores a table in which an index value and a combination pattern of values set to partial items of information among a plurality of items of information included in the parameter are correlated, wherein the receiver receives the parameter in which the partial items of information among the plurality of items of information included in the parameter are omitted, and in which the index value is included instead of the omitted partial items of information, and the processor generates the downlink physical data channel using the received parameter and values represented by the combination pattern corresponding to the index value.

5. The base station according to claim 1, wherein the receiver receives information to be transmitted to the terminal as downlink control information and receives the parameter in which the information to be transmitted to the terminal as the downlink control information among the plurality of items of information included in the parameter is omitted, and the processor generates the downlink physical data channel using the received parameter and the information to be transmitted to the terminal as the downlink control information.

6. The base station according to claim 1, wherein the second base station performs processing of Layer 2 or processing of Layer 2 and some of Layer 1, and the base station performs processing of Layer 1 or processing other than the processing of Layer 1 performed by the second base station among the processing of Layer 1.

7. The base station according to claim 1, wherein the parameter includes all or some of an identifier for uniquely identifying the terminal, a transport block size, a cell unique identifier, a modulation scheme, a coding rate, a redundancy version, the number of layers, precoding information, allocation resource information, and information indicating a location of resources allocated to channels other than the downlink physical data channel.

8. A transmission method of a base station, the transmission method comprising:

receiving a parameter and data from a second base station, wherein the parameter is used for generating a downlink physical data channel and the data is to be transmitted toward a terminal;

generating the downlink physical data channel by performing processing of Layer 1 on the data using the parameter; and transmitting the generated downlink physical data channel, wherein the base station is used as a first base station in a 5G wireless communication system including the first base station, the second base station that communicates with the first base station, and the terminal that communicates with the first base station, wherein the first base station and the second base station belong to the 5G wireless communication system, and wherein the second base station does not directly communicate with the terminal.

9. The base station according to claim 2, wherein the receiver receives the parameter in which predetermined information among a plurality of items of information included in the parameter is omitted, and when the omitted predetermined information has been received in the past, the processor generates the downlink physical data channel using the received parameter and the predetermined information received in the past.

10. The base station according to claim 2, further comprising:

a memory that stores a table in which an index value and a combination pattern of values set to partial items of information among a plurality of items of information included in the parameter are correlated, wherein the receiver receives the parameter in which the partial items of information among the plurality of items of information included in the parameter are omitted, and in which the index value is included instead of the omitted partial items of information, and the processor generates the downlink physical data channel using the received parameter and values represented by the combination pattern corresponding to the index value.

11. The base station according to claim 3, further comprising:

a memory that stores a table in which an index value and a combination pattern of values set to partial items of information among a plurality of items of information included in the parameter are correlated, wherein the receiver receives the parameter in which the partial items of information among the plurality of items of information included in the parameter are omitted, and in which the index value is included instead of the omitted partial items of information, and the processor generates the downlink physical data channel using the received parameter and values represented by the combination pattern corresponding to the index value.

12. The base station according to claim 2, wherein the receiver receives information to be transmitted to the terminal as downlink control information and receives the parameter in which the information to be transmitted to the terminal as the downlink control information among the plurality of items of information included in the parameter is omitted, and the processor generates the downlink physical data channel using the received parameter and the information to be transmitted to the terminal as the downlink control information.

13. The base station according to claim 3, wherein the receiver receives information to be transmitted to the terminal as downlink control information and receives the parameter in which the information to be transmitted to the terminal as the downlink control information among the plurality of items of information included in the parameter is omitted, and the processor generates the downlink physical data channel using the received parameter and the information to be transmitted to the terminal as the downlink control information.

14. The base station according to claim 4, wherein the receiver receives information to be transmitted to the terminal as downlink control information and receives the parameter in which the information to be transmitted to the terminal as the downlink control information among the plurality of items of information included in the parameter is omitted, and the processor generates the downlink physical data channel using the received parameter and the information to be transmitted to the terminal as the downlink control information.

15. The base station according to claim 2, wherein
the second base station performs processing of Layer 2 or processing of Layer 2 and some of Layer 1, and
the base station performs processing of Layer 1 or processing other than the processing of Layer 1 performed by the second base station among the processing of Layer 1.

16. The base station according to claim 3, wherein
the second base station performs processing of Layer 2 or processing of Layer 2 and some of Layer 1, and
the base station performs processing of Layer 1 or processing other than the processing of Layer 1 performed by the second base station among the processing of Layer 1.

17. The base station according to claim 4, wherein
the second base station performs processing of Layer 2 or processing of Layer 2 and some of Layer 1, and
the base station performs processing of Layer 1 or processing other than the processing of Layer 1 performed by the second base station among the processing of Layer 1.

18. The base station according to claim 2, wherein
the parameter includes all or some of an identifier for uniquely identifying the terminal, a transport block size, a cell unique identifier, a modulation scheme, a coding rate, a redundancy version, the number of layers, precoding information, allocation resource information, and information indicating a location of resources allocated to channels other than the downlink physical data channel.

19. The base station according to claim 3, wherein
the parameter includes all or some of an identifier for uniquely identifying the terminal, a transport block size, a cell unique identifier, a modulation scheme, a coding rate, a redundancy version, the number of layers, precoding information, allocation resource information, and information indicating a location of resources allocated to channels other than the downlink physical data channel.

20. The base station according to claim 4, wherein
the parameter includes all or some of an identifier for uniquely identifying the terminal, a transport block size, a cell unique identifier, a modulation scheme, a coding rate, a redundancy version, the number of layers, precoding information, allocation resource information, and information indicating a location of resources allocated to channels other than the downlink physical data channel.

* * * * *